United States Patent
Kim (10) Patent No.: US 7,032,731 B2
(45) Date of Patent: Apr. 25, 2006

(54) SEAT CUSHION PUMPING DEVICE FOR VEHICLE

(75) Inventor: Jae-Ho Kim, Kyungsangbuk-Do (KR)

(73) Assignee: Das Co., LTD, (KR)

( * ) Notice: Subject to any disclaimer, the term of this patent is extended or adjusted under 35 U.S.C. 154(b) by 0 days.

(21) Appl. No.: 10/784,590

(22) Filed: Feb. 23, 2004

(65) Prior Publication Data

US 2005/0006193 A1    Jan. 13, 2005

(30) Foreign Application Priority Data

Jul. 12, 2003   (KR)   ....................... 10-2003-0047547

(51) Int. Cl.
*F16D 41/06*   (2006.01)
*F16D 41/10*   (2006.01)
*F16D 67/02*   (2006.01)
*A47C 7/02*    (2006.01)

(52) U.S. Cl. ....................... 192/15; 192/19; 192/223.2; 297/344.12

(58) Field of Classification Search ............ 192/223.2, 192/15, 19, 38; 297/338, 344.12
See application file for complete search history.

(56) References Cited

U.S. PATENT DOCUMENTS

| | | | | |
|---|---|---|---|---|
| 5,794,479 A | * | 8/1998 | Schwarzbich | 192/223.2 |
| 5,896,973 A | * | 4/1999 | Hochmuth et al. | 192/223.2 |
| 6,253,894 B1 | * | 7/2001 | Schumann et al. | 192/15 |
| 6,273,233 B1 | * | 8/2001 | Denis | 192/223.2 |
| 6,481,557 B1 | * | 11/2002 | Denis | 192/223.2 |
| 6,640,952 B1 | * | 11/2003 | Baloche et al. | 192/223.2 |
| 6,675,945 B1 | | 1/2004 | Kim | |

FOREIGN PATENT DOCUMENTS

KR   10-2003-0073950   9/2003

* cited by examiner

*Primary Examiner*—Rodney H. Bonck
(74) *Attorney, Agent, or Firm*—St. Onge Steward Johnston & Reens LLC (57) ABSTRACT

Disclosed herein is a seat cushion pumping device for a vehicle adapted to adjust a height of a seat cushion. The seat cushion pumping device comprises a clutch unit adapted to transmit a rotating force to gears of a conventional link member for adjusting the height of a seat cushion in a desired direction where the seat cushion is to be moved, and a brake unit for fixing the operated link member so as not to move. The clutch unit and the brake unit are accommodated between a lower bracket and an upper bracket, which are positioned in front of a mounting bracket for accommodating the entire pumping device there between.

4 Claims, 13 Drawing Sheets

SEAT CUSHION PUMPING DEVICE FOR VEHICLE

This application claims priority of pending Korean Patent Application No. 2003-0047547 filed Jul. 12, 2003.

BACKGROUND OF THE INVENTION

1. Field of the Invention

The present invention relates to a seat cushion pumping device for a vehicle, and more particularly to an improved pumping device, which is adapted to adjust a height of a vehicle seat cushion in conformity with the body shape of a driver or passenger.

2. Description of the Related Art

As well known to those skilled in the art, a pumping device for a vehicle functions to adjust a height of a seat cushion constituting a vehicle seat in conformity with the body shape of a driver or passenger.

Various seat cushion pumping devices have been developed and used. The applicant of the present invention also had developed various kinds of pumping devices including a drum brake, and had filed one of them in the Korean Industrial Property Office as Serial No. 10-2002-013741. Now, a conventional pumping device disclosed by the applicant of the present invention will be explained as below with reference to FIG. 13.

Figure 13:
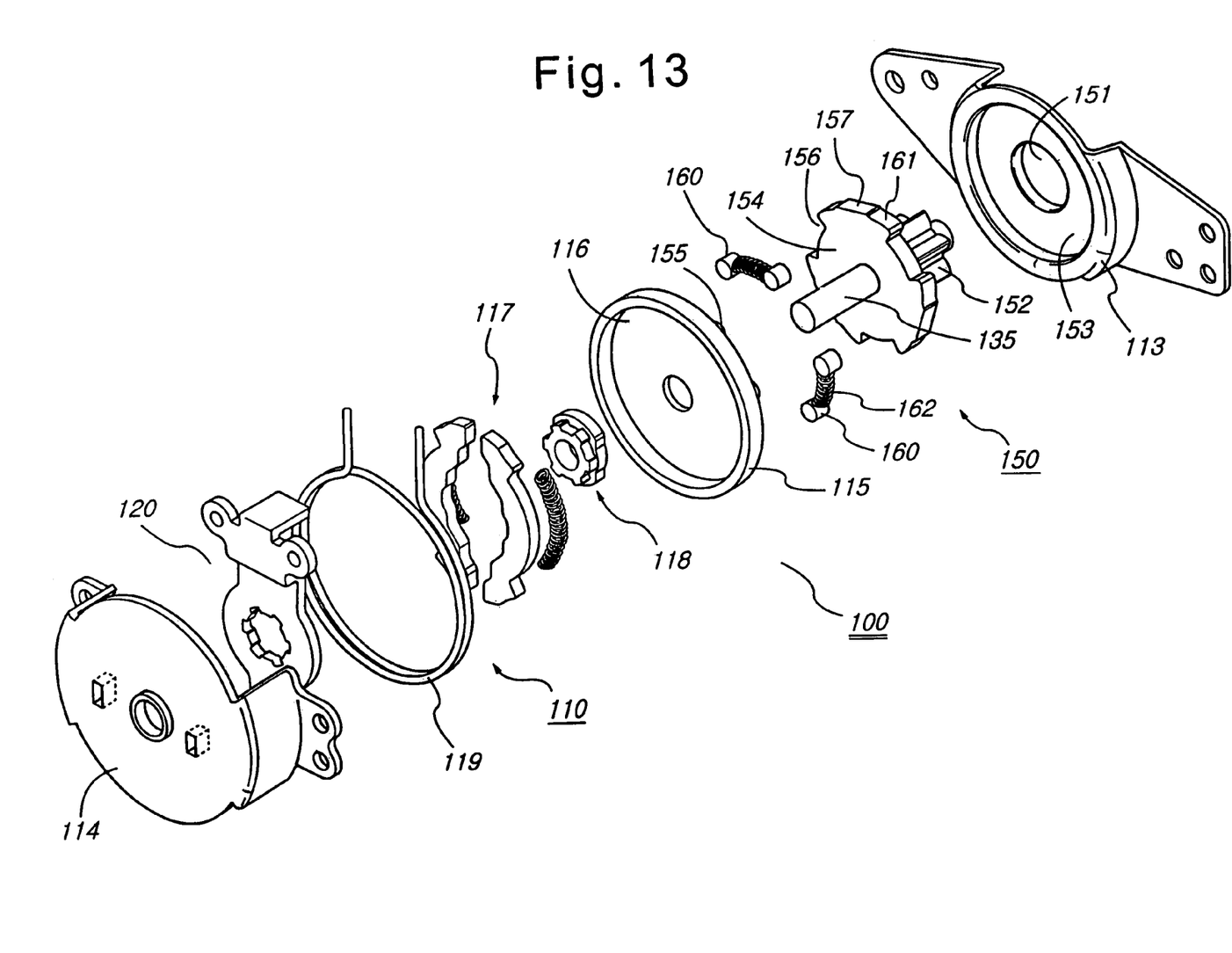
FIG. 13 is an exploded perspective view illustrating a conventional seat cushion pumping device for a vehicle.

As shown in FIG. 13, the conventional seat cushion pumping device, designated as reference numeral 100, comprises a clutch unit 110 adapted to generate an operating force required for adjusting a height of a seat cushion, and a brake unit 150 adapted to conserve the operating force of the clutch unit 110. The clutch unit 110 and the brake unit 150 are arranged at both front and rear sides of a base 115 positioned halfway between a body 113 and a cover 114. That is, the clutch unit 110 is interposed between the cover 114 and one side of the base 115, and the brake unit 150 is interposed between the body 113 and the other side of the base 115.

The clutch unit 110 comprises a pair of clutch blocks 117 configured to be accommodated in a clutch recess 116 defined on one surface of the base 115, a lever block 118 interposed between the pair of clutch blocks 117 and adapted to operate them, and a lever 120 coupled around the lever block 118 by interposing a lever spring 119 for use in the restoration thereof.

The brake unit 150 comprises a link connection gear 152 secured around a shaft 135 penetrating through a shaft hole 151 defined in the body 113 and meshed with gears of link means, conventionally known in the art and usable for adjusting the height of the seat cushion, and an operating plate 154 secured around the shaft and accommodated in a receiving recess 153 defined on one surface of the body 113.

The brake unit 150 further comprises power transmission pins 155 formed at the other surface of the base 115 and adapted to transmit the operating force of the clutch unit 110 to power transmission grooves 156 defined on an outer circumferential surface of the operating plate 154. Each of the power transmission pins 155 is provided at both sides thereof with pin pushers.

The operating plate 154 has flattened portions 157, and is defined at both ends of the respective flattened portions 157 with a pair of inclined wedge-shaped grooves 161.

As another constituent component of the brake unit 150, brake pins 160 are accommodated, respectively, in spaces defined between the respective inclined wedge-shaped grooves 161 and the body 113, and are adapted to transmit the operating force of the base 115 only in an operating direction while preventing the transmission of the operating force in a reverse direction.

As yet another constituent component of the brake unit 150, brake springs 162 are installed, respectively, between two brake pins 160, and are adapted to fixedly maintain the brake pins 160 in the space defined between the inclined wedge-shaped grooves 161 and the body 113. In this case, the pin pushers integrally formed at both sides of the respective power transmission pins 155 serve to release the brake pins 160 when the lever 120 is returned to its original position.

The conventional seat cushion pumping device 100 suffers from defects in that, in operation, the clutch unit comes into frictional contact with an inner circumferential surface of a drum included in the base by means of the clutch blocks operated by the lever block, and frictional surfaces there between are concentrated on the same line, resulting in an incomplete clutching operation.

An additional defect of the conventional seat cushion pumping device consists in that, in relation to the lever block adapted to operate the clutch blocks, its relatively short radius from a center point to an outer circumferential surface thereof tends to generate an excessive load in operation, resulting in an increase in wear of constituent components.

Yet another defect of the conventional seat cushion pumping device consists in that, in relation to the brake unit, although the operating plate and brake pins are arranged equiangularly in three directions thus exhibiting visual stability, they cannot sufficiently resist the overall region of the body during an actual braking operation, resulting in a deterioration in a braking force due to a stress concentration phenomenon, thus causing a deterioration in durability, quality, and operation capability of the pumping device itself.

SUMMARY OF THE INVENTION

Therefore, the present invention has been made in view of the above problems, and it is an object of the present invention to provide a seat cushion pumping device for a vehicle, which enables an overall height of a seat cushion to be easily adjusted by using a single pumping device, ensures a more easy clutching operation even with a relatively low operating force, and enhances a braking force, resulting in an improvement in durability, quality, and operation capability of the pumping device itself and the convenience of use thereof.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Reference will now be made in greater detail to a preferred embodiment of the invention, an example of which is illustrated in the accompanying drawings. Wherever possible, the same reference numerals will be used throughout the drawings and the description to refer to the same or like parts.

A seat cushion pumping device for a vehicle in accordance with the present invention will be explained with reference to FIGS. 1 to 12.

Figure 1:
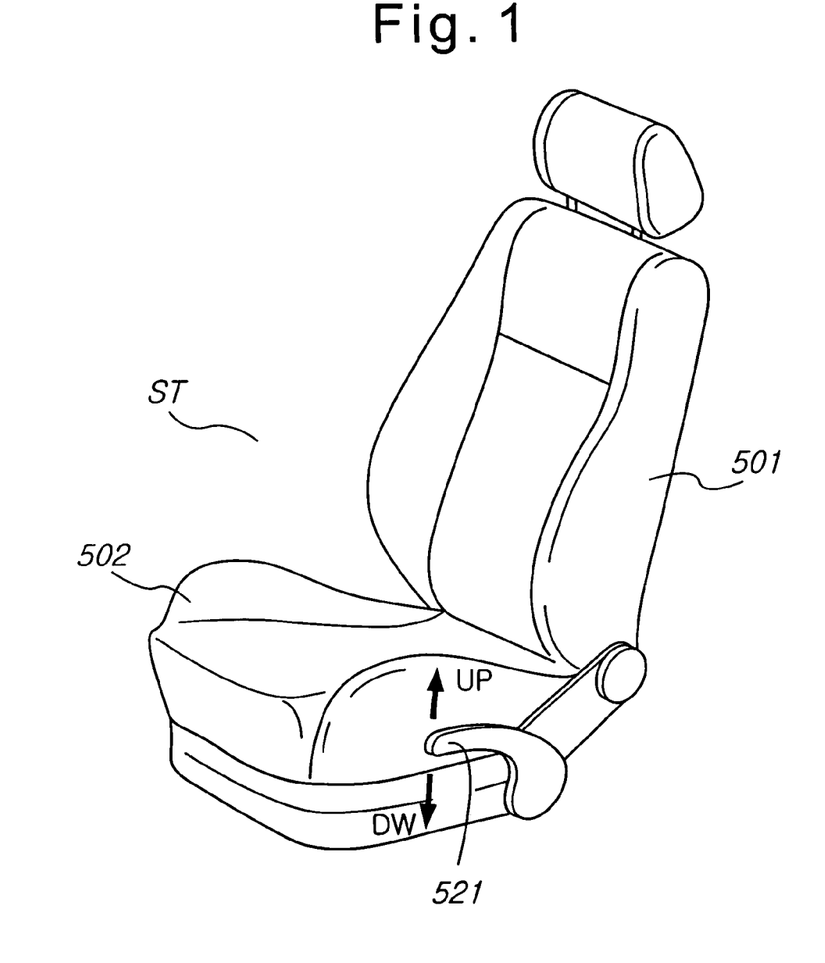
FIG. 1 is a perspective view illustrating a state wherein a seat cushion pumping device in accordance with the present invention is applied to a seat cushion of a vehicle.

In a seat ST consisting of a seat back 501 and a seat cushion 502, an external link means of known type is installed on front and rear portions of a lower surface of the seat cushion 502, and is adapted to allow a height of the seat cushion 502 to be adjusted as desired, and gears are provided on the link means for the operation thereof. A pumping device is engaged with the gears for rotating them in forward and rearward directions, thereby functioning to adjust the height of the seat cushion 502.

Figure 2:
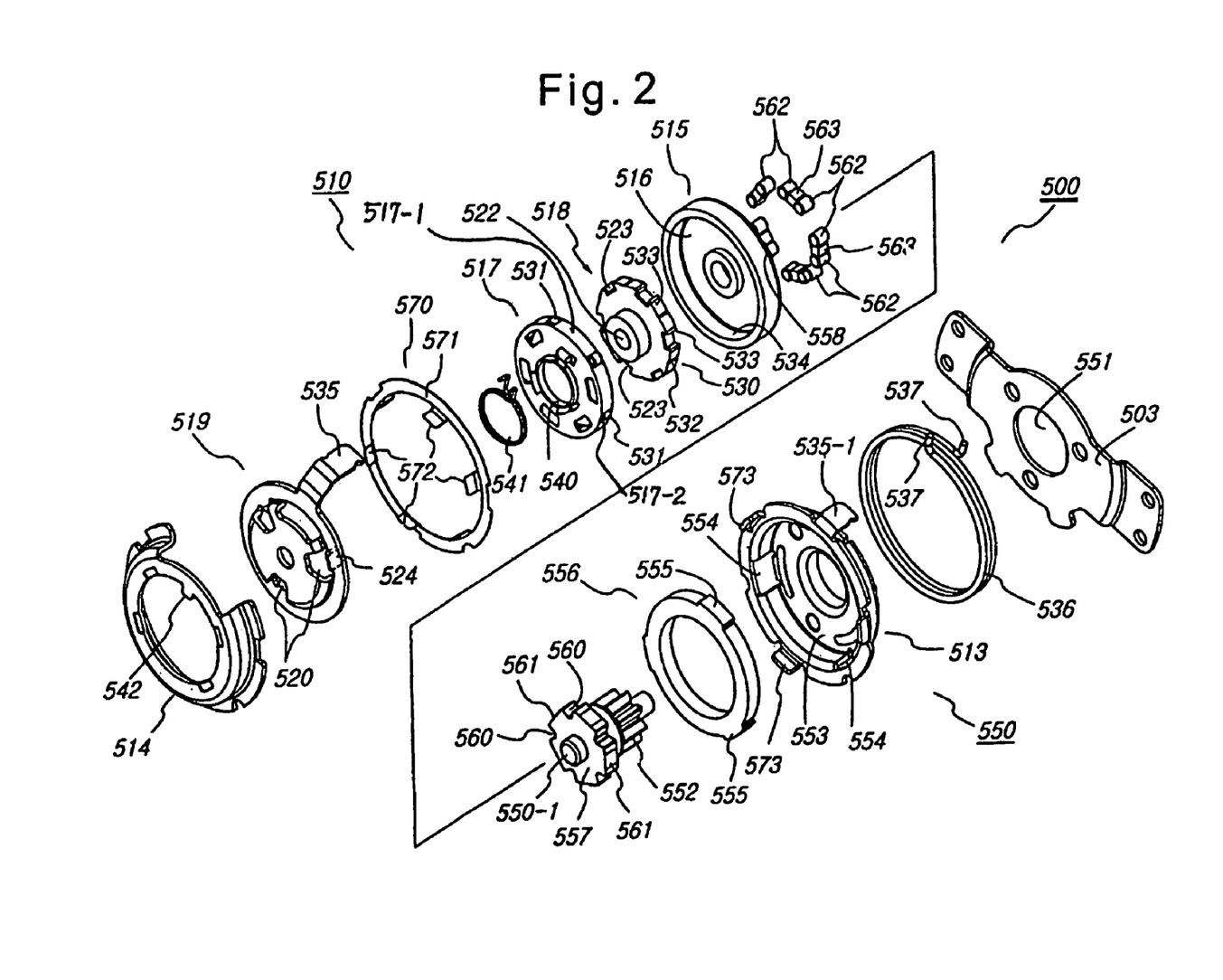
FIG. 2 is an exploded perspective view illustrating: the seat cushion pumping device for a vehicle in accordance with the present invention.
Figure 3:
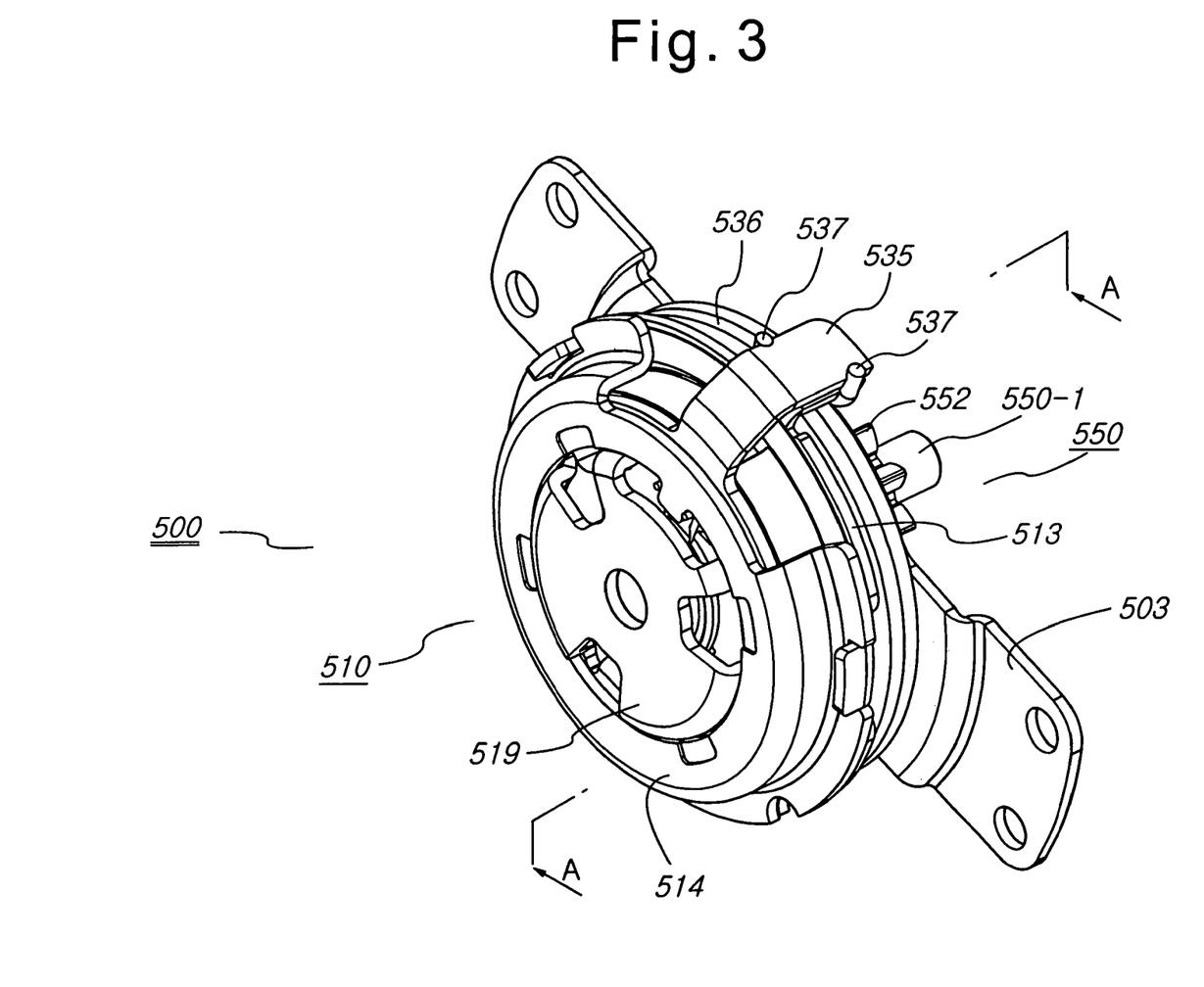
FIG. 3 is a perspective view illustrating an assembled state of the seat cushion pumping device for a vehicle in accordance with the present invention.
Figure 4:
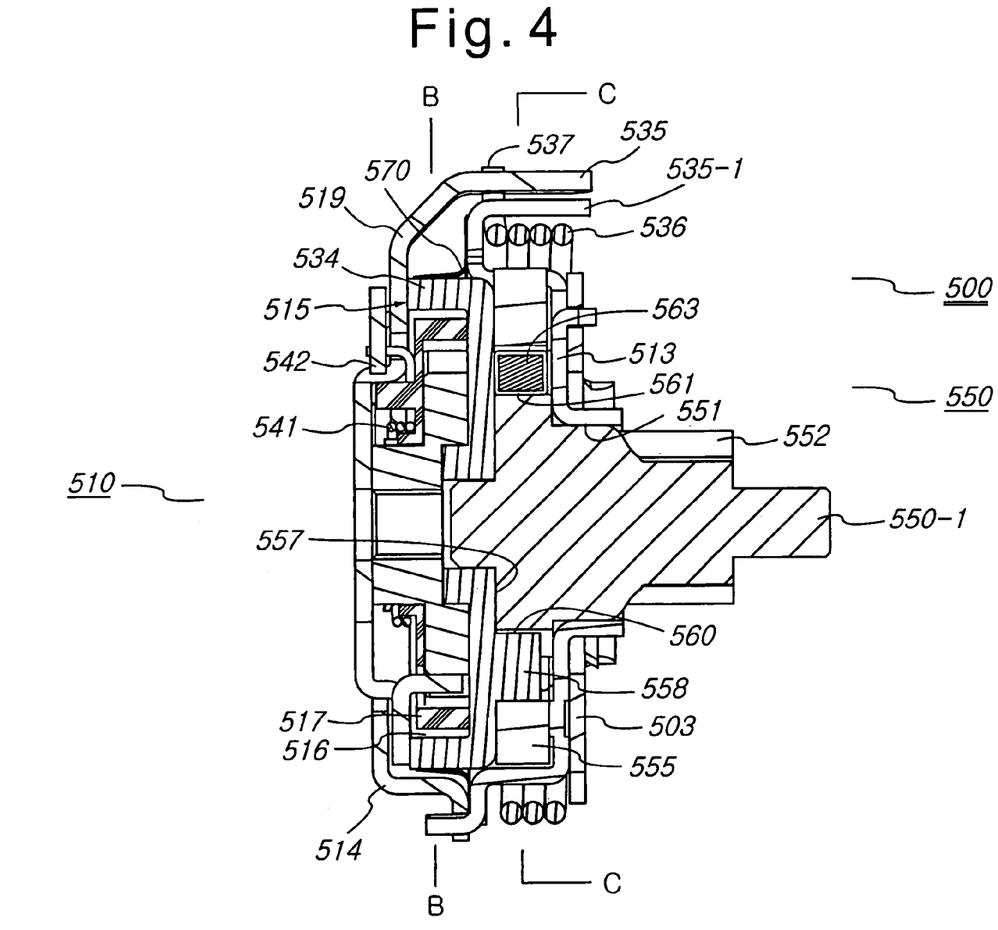
FIG. 4 is a sectional view taken along a line A—A shown in FIG. 3, for explaining the seat cushion pumping device for a vehicle in accordance with the present invention.

The pumping device in accordance with the present invention, designated as reference numeral 500, comprises a clutch unit 510 adapted to transmit a rotating force to the gears of the link means in a desired direction where the seat cushion 102 is to be moved, and a brake unit 550 for fixing the operated link means in an inoperative position.

The clutch unit 510 and the brake unit 550 are accommodated between a lower bracket 513 and an upper bracket 514, which are positioned in front of a mounting bracket 503. These brackets are formed with fastening holes for accommodating the entire seat cushion pumping device 500.

Between the lower bracket 513 and the upper bracket 514 is interposed a base 515. In this case, the clutch unit 510 is arranged between the upper bracket 514 and one surface of the base 515, and the brake unit 550 is positioned between the lower bracket 513 and the other surface of the base 515.

The clutch unit 510 comprises a roller assembly 517 accommodated in a clutch recess 516 defined on the one surface of the base 515, a lever block 518 inserted in the roller assembly 517 to rotate it, and a lever bracket 519 externally coupled to the lever block 518.

The lever bracket 519 is equally and radially formed with fastening holes 520 for use in the insertion of fastening protrusions formed at a lever 521. The lever 521 is further bolted through a screw bore 522 centrally formed at the lever block 518. The lever block 518 is further equally and radially formed at an outer circumferential surface thereof with fastening grooves 523, into which operating protrusions 524 radially formed at the lever bracket 519 are engaged, respectively. With such a configuration, the lever block 518 is able to be operated by the lever 521.

The lever block 518 is further formed with a plurality of operating surfaces 530 at the outer circumferential surface thereof. The operating surfaces 530 are centrally formed with roller slits 532, respectively, for the positioning of a plurality of rollers 531 received in roller-receiving cavities 517-2 disposed at regular intervals in an annular retainer ring 517-1 of the roller assembly 517.

The operating surfaces 530 are further formed at both sides of the respective roller slits 532 with curvedly inclined operating surfaces 533. The curvedly inclined operating surfaces 533 are raised relative to the roller slits 532. Such a configuration causes the rollers 531 to come into frictional contact with a drum 534 of the base 515, thereby allowing the base 515 to rotate by using an operating force of the lever 521.

From an outer circumferential surface of the lever bracket 519 a sprin hook 535 protrudes toward the base 515. Along with a spring hook 535-1 protruding from the lower bracket 513, the spring hook 535 is caught by a pair of protruding pieces 537 of a return spring 536, which is interposed between the mounting bracket 503 and the lower bracket 513, thereby ensuring the lever 521 to return in the original position.

Figure 5:
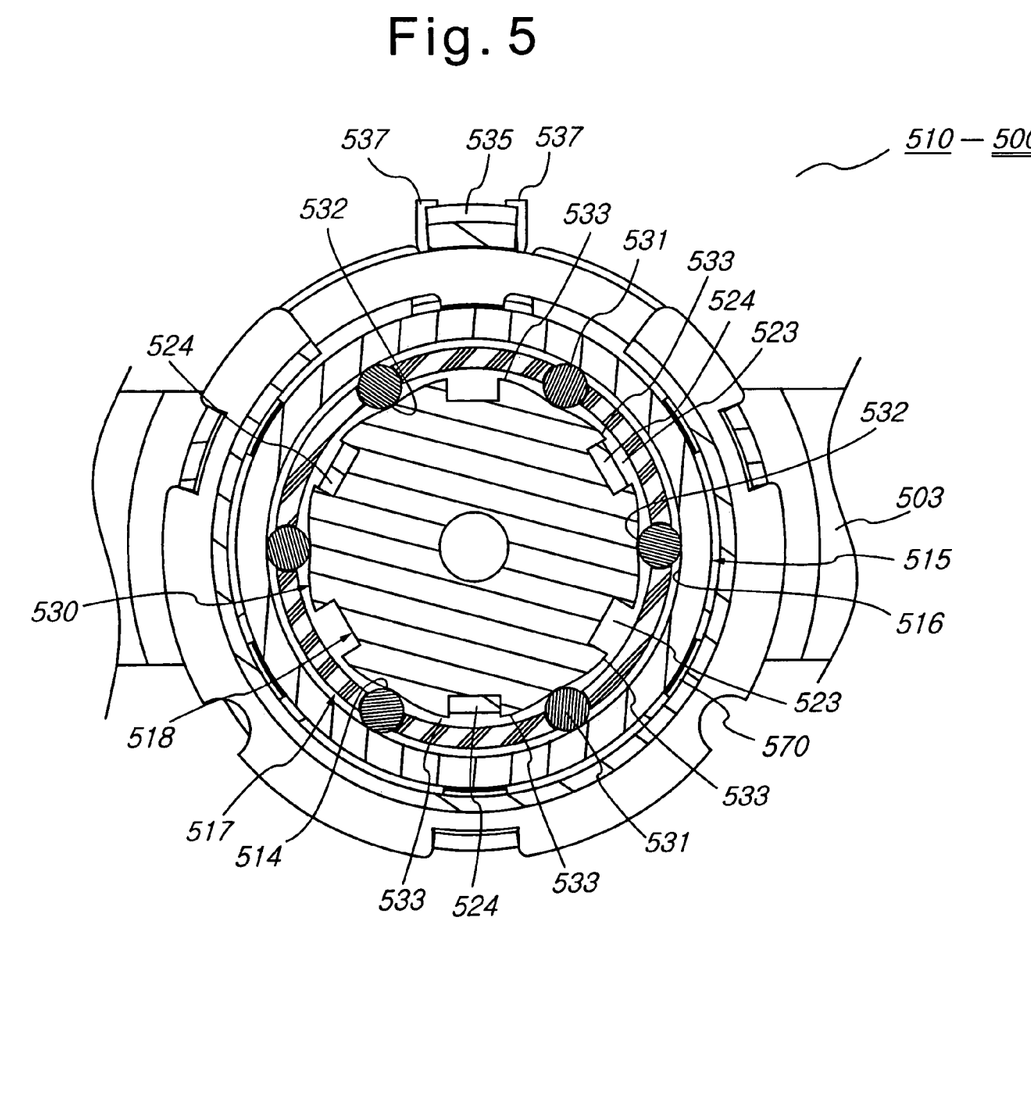
FIG. 5 is a sectional view taken along a line B—B shown in FIG. 4, for explaining a clutch unit of the seat cushion pumping device for a vehicle in accordance with the present invention.

The roller assembly 517 is centrally formed with a circular boss 540, around which a clutch spring 541 is coupled for returning the roller assembly 517 in the neutral position as shown in FIG. 5. In such a position of the roller assembly 517, both ends of the clutch spring 541 are caught by one of spring pins 542, which protrudes downward from the upper side of an inner diameter surface of the upper bracket 514.

The brake unit 550 comprises a link connection gear 552 secured around a shaft 550-1. The link connection gear 552 is configured to penetrate through a shaft hole of the lower bracket 513 and a shaft hole 551 of the mounting bracket 503, thereby being engaged with the gears of the link means.

At one side of the link connection gear 552 is provided an operating plate 557, which is accommodated in a brake guide 556. The brake guide 556 is formed at an outer circumferential surface thereof with protrusions 555, which are configured to be engaged with slots 554 radially arranged along the rim of a receiving recess 553 defined on one surface of the lower bracket 513.

Figure 9:
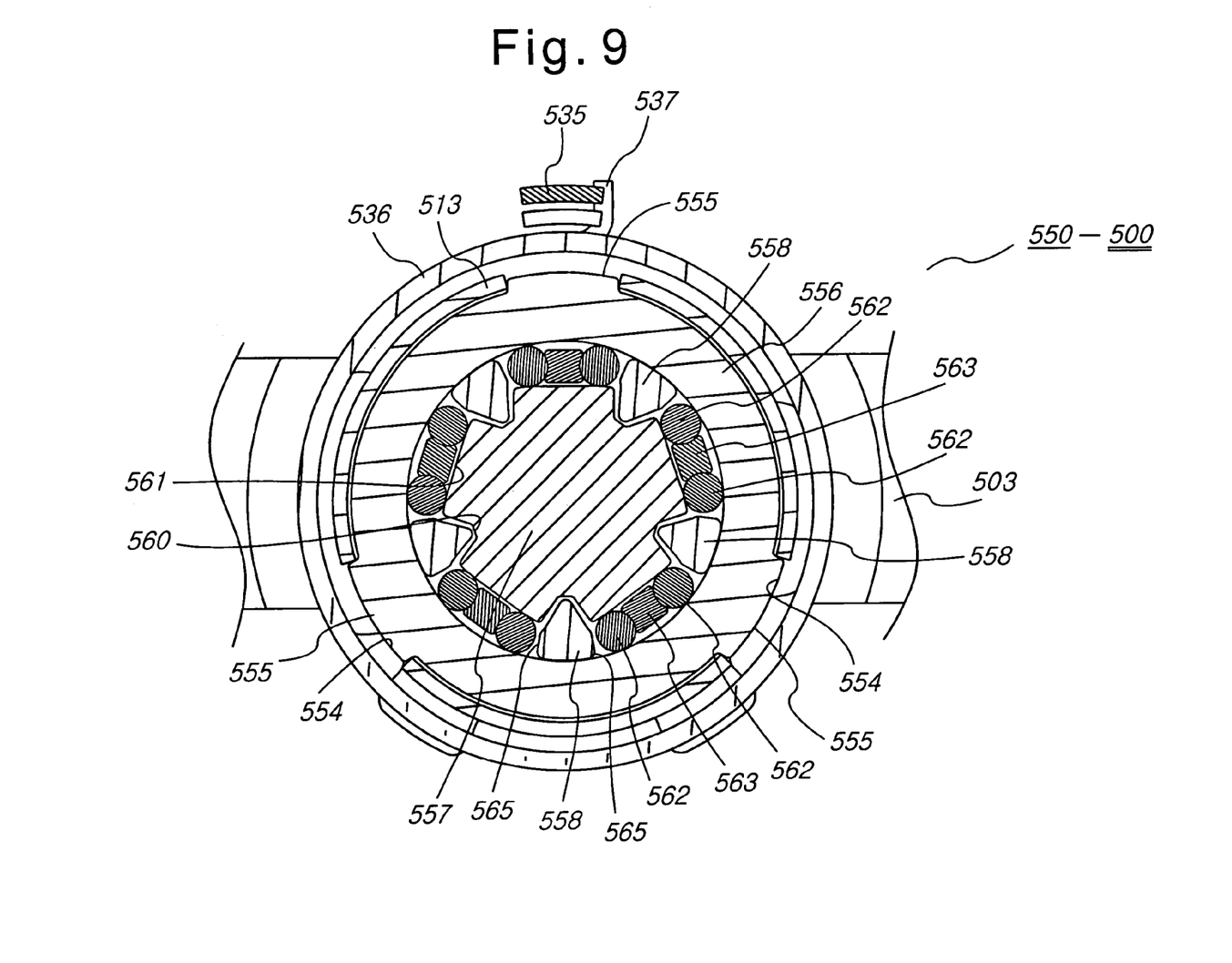
FIG. 9 is a sectional view taken along a line C—C shown in FIG. 4, for explaining a brake unit of the seat cushion pumping device for a vehicle in accordance with the present invention.

Power transmission grooves 560 are radially defined on an outer circumferential surface of the operating plate 557 to be spaced apart from one another by the same angle in a circumferential direction. In order to achieve a more stable stress dispersion effect, the power transmission grooves 560 are arranged equiangularly in five directions. Power transmission pins 558 integrally formed on the other surface of the base 515 operatively act with the power transmission grooves 560 so that power of the base 515 can be transmitted to the operating plate 557.

The operating plate 557 is further formed at the outer circumferential surface thereof with flattened portions 561 alternately with the power transmission grooves 560. In spaces defined between the flattened portions 561 and the lower bracket 513 are accommodated plural pairs of brake pins 562 to transmit only in an operating direction power of the base member 515 to the operating plate 557 connected with the link connection gear 552 while preventing operating force transmission in a reverse direction. In this way, the brake pins 562 play a role in a one-way clutch.

At both ends of each flattened portion 561 are positioned a pair of the brake pins 562, and between the brake pins 562 is interposed an elastic member 563 made of a urethane or rubber material. The elastic member 563 serves to continuously push the brake pins 562 in a circumferential direction of the flattened portion 561, thereby fixedly maintaining the brake pins 562 between the flattened portions 561 and an inner circumferential surface of the brake guide 556.

Pin pushers 565 are integrally formed at both sides of the respective power transmission pins 558 which are integrally formed on the other surface of the base 515. The pin pushers 565 are positioned adjacent to the brake pins 562.

Around the outer circumferential surface of the base 515 is provided a push nut 570 for preventing the base 515 from moving due to gaps generated between the power transmission pins 558 thereof and the power transmission grooves 560 of the operating plate 557.

The push nut 570 includes a push nut body 571 as an elastic thin sheet member, and base plate pieces 572 formed at an inner diameter surface of the push nut body 571. The base plate pieces 572 have an "L"-shape for ensuring tight contact thereof to the outer circumferential surface of the base 515. The push nut body 571 is compressed at an outer diameter surface thereof by flanges 573 protruding from the lower bracket 513.

Now, the operation of the seat cushion pumping device 100 according to the present invention will be explained.

When a driver or passenger manipulates the lever 521 of the pumping device 500 in an upward direction (UP) or downward direction (DW), as the link means installed on the lower surface of the seat cushion 502 is lifted or lowered in a corresponding direction, a height of the seat cushion 102 can be adjusted in conformity with a desire of the driver or passenger.

By grasping and pulling in the upward direction (UP) or pushing in the downward direction (DW) the lever 521 exposed out of the seat 103, the lever bracket 519 of the clutch unit 510, which is connected to the lever 521, is operated.

Figure 6:
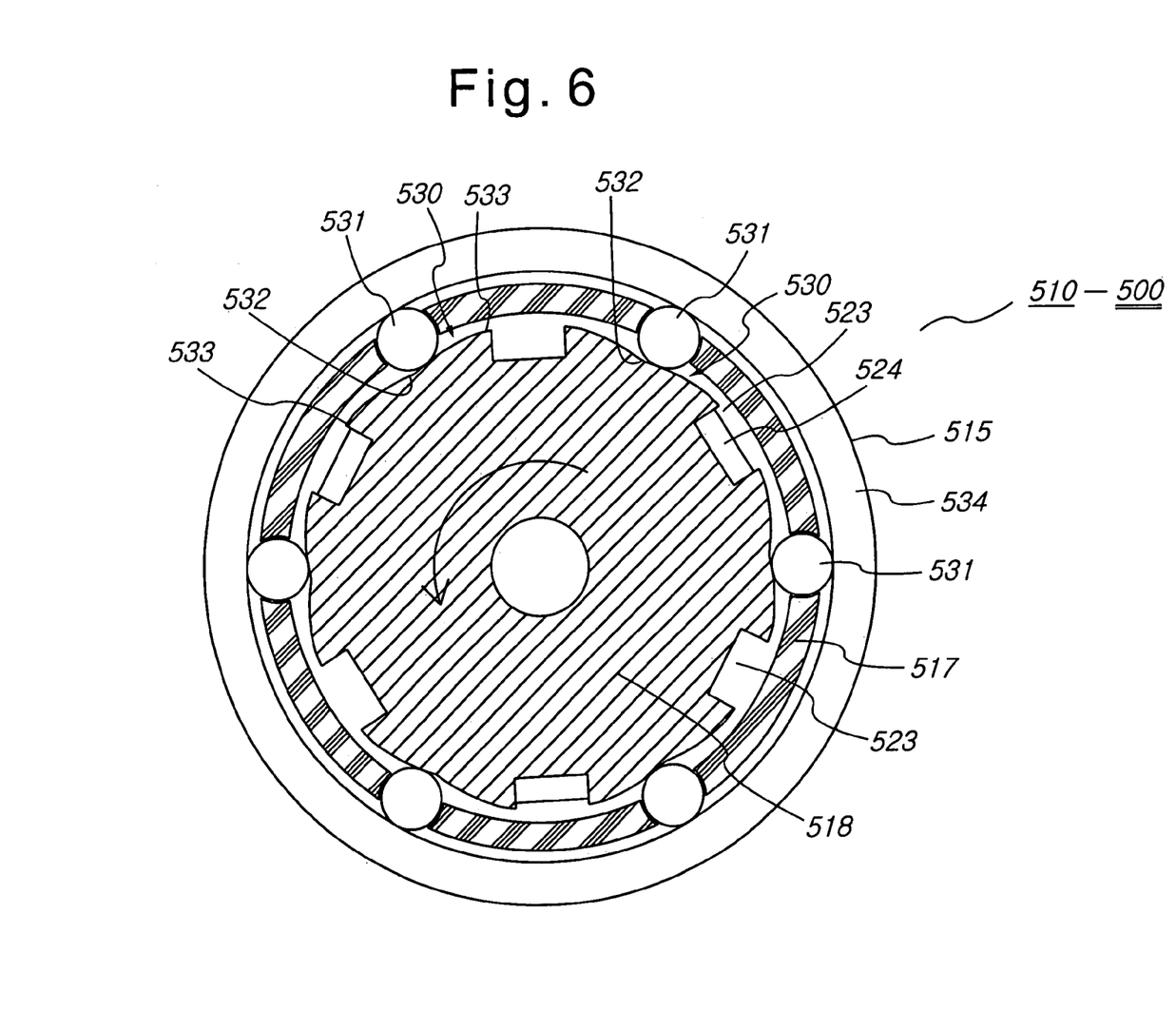
FIG. 6 is a sectional view illustrating the clutch unit of the seat cushion pumping device for a vehicle in accordance with the present invention, in an initial state wherein the clutch is operated.
Figure 7:
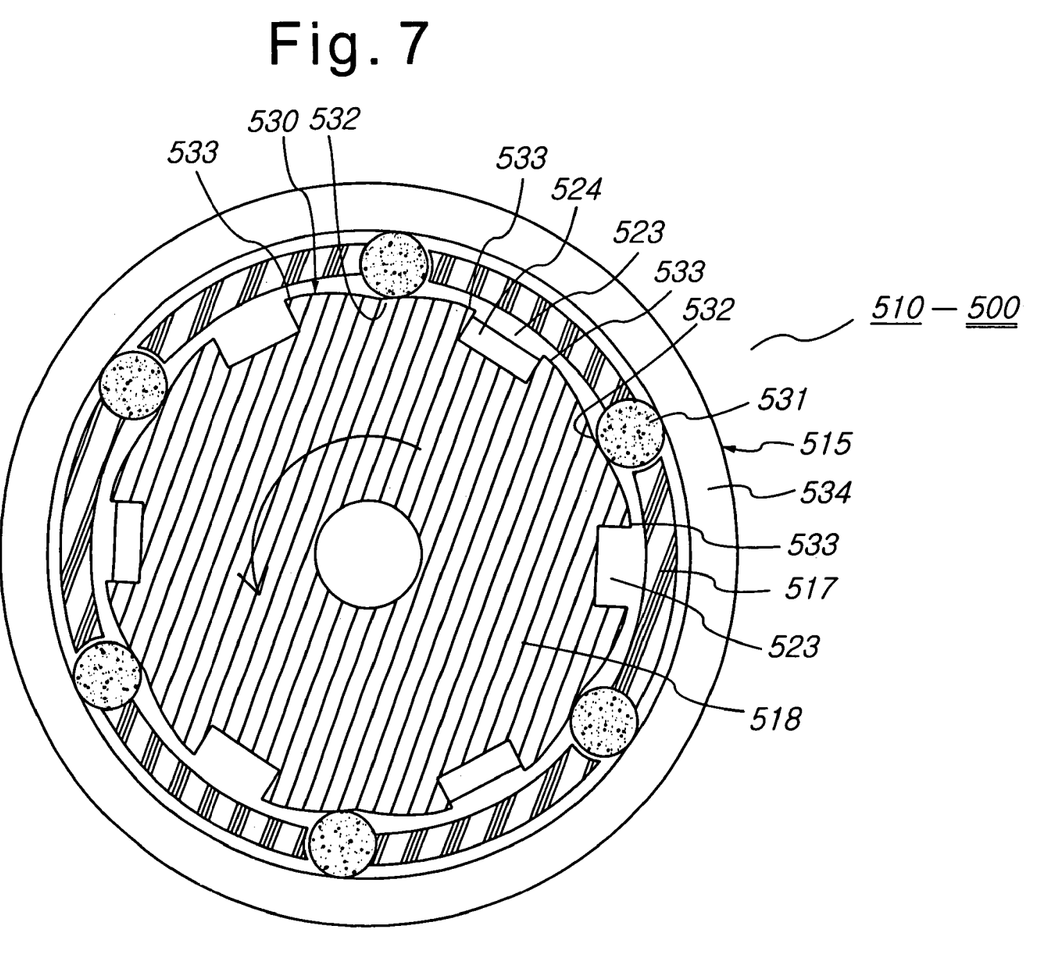
FIG. 7 is a sectional view illustrating the clutch unit of the seat cushion pumping device for a vehicle in accordance with the present invention, in a state wherein the clutch unit is maximally actuated.

As the lever bracket 519 operates the lever block 518, the lever block 518 is rotated in the same rotating direction as the lever 521 and enlarges a diameter of the roller assembly 517. By this fact, as the rollers 531 of the roller assembly 517 come into close contact with the drum 534 of the base 515, a gap between the rollers 531 and the drum 534 of the base 515 is removed, and the base 515 is also rotated in the operating direction of the lever 521.

Explaining the above description in detail, if the lever block 518 is rotated, each of the rollers 531, which is received in each roller slit 532 centrally formed on each operating surface 530 of the lever block 518, is compressed by one of the curvedly inclined operating surfaces 533 located at both sides of the roller slit 532. In this way, the curvedly inclined operating surfaces 533 enable the rollers 531 to continuously come into close contact with the drum 534 of the base 515, thereby achieving the rotation of the base 515 as stated above.

During the rotation of the roller assembly 517, the clutch spring 541, which is fitted around the boss 540 centrally formed at the roller assembly 517 and is caught at both ends thereof by one of the spring pins 542 formed at the upper bracket 514, generates a torsion force, and thus is ready to return the roller assembly 17 to its original position.

Figure 10:
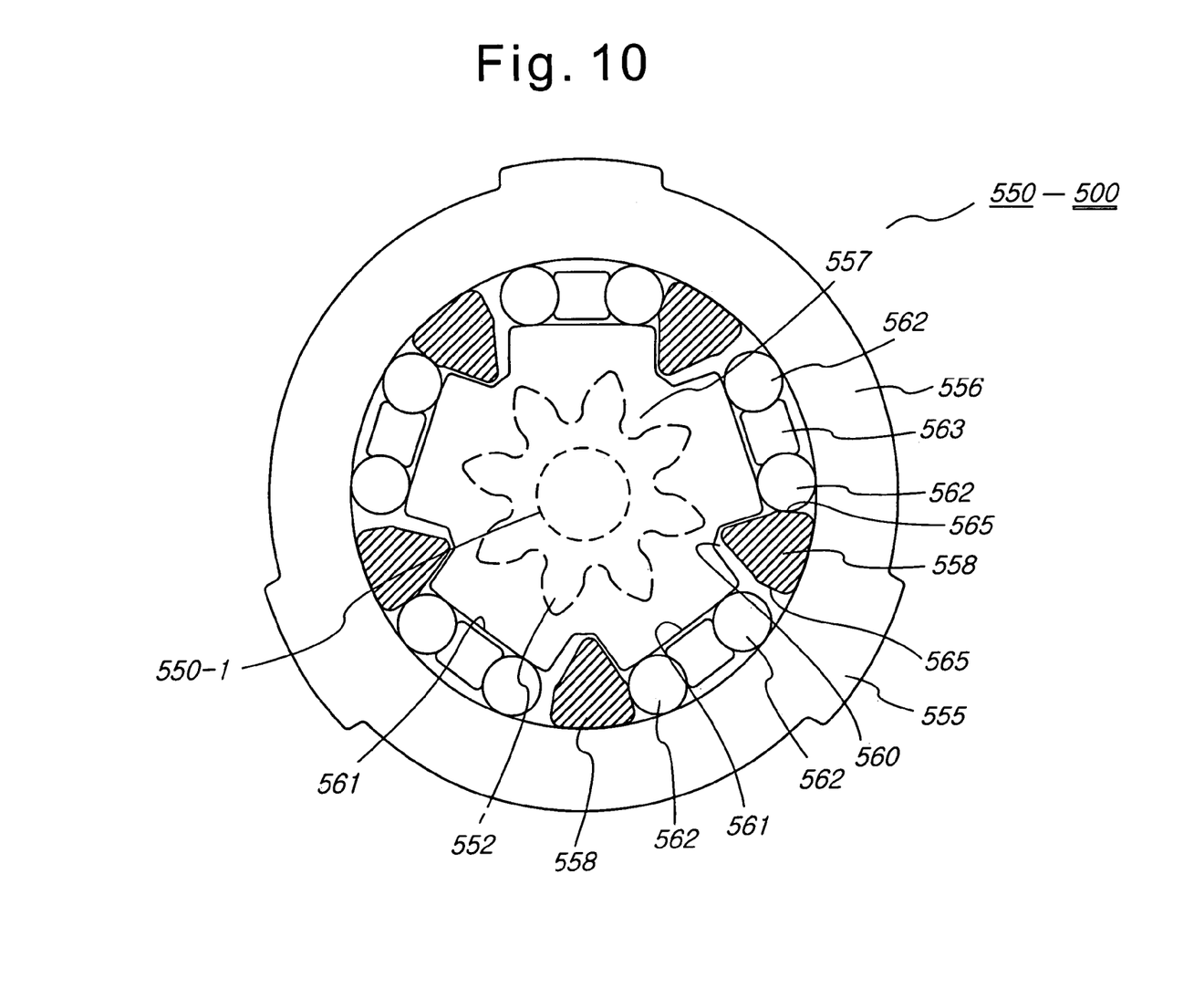
FIG. 10 is a sectional view illustrating the brake unit of the seat cushion pumping device for a vehicle in accordance with the present invention, in an initial state wherein the clutch unit is operated.

If the base 515 is rotated, due to the fact that the power transmission pins 558 formed at the other surface of the base 515 operatively act with the power transmission grooves 560 formed at the operating plate 557 of the brake unit 550, the operating plate 557 is also rotated.

As a result, the shaft 550-1, around which the operating plate 557 is secured, is also rotated, and the link connection gear 552 secured around the shaft 550-1 rotates the gears of the link means to lift or lower the seat cushion 502 in the direction where the lever 521 is operated.

Figure 11:
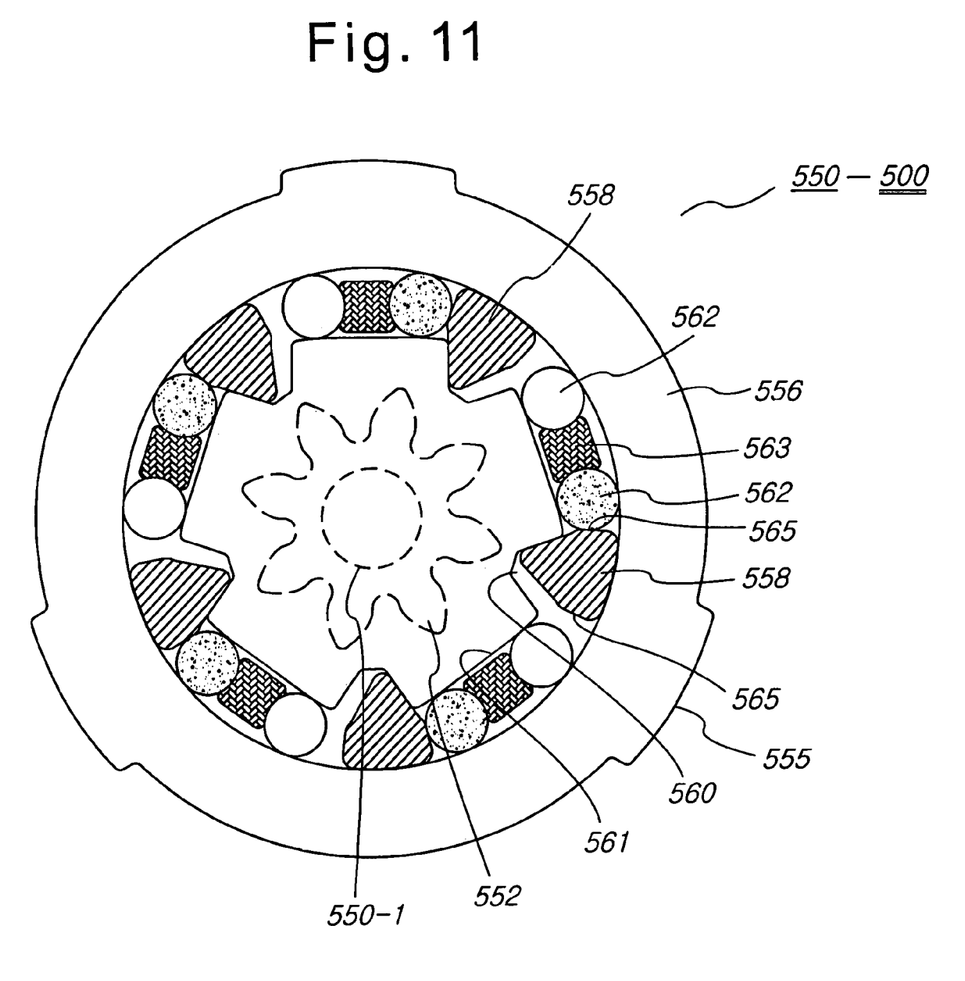
FIG. 11 is a sectional view illustrating a brake unit which is in an inoperative position while the clutch unit is operated, in the seat cushion pumping device for a vehicle in accordance with the present invention.

In this case, as the base 515 receiving a rotating force of the lever 521 is rotated, the pin pushers 565 integrally formed at both sides of the respective power transmission pins 58, which in turn are integrally formed on the other surface of the base 515, move the brake pins 562, respectively, positioned at both sides of the respective flattened portions 561 of the operating plate 557, thereby causing the brake pins 562 not to be fixedly maintained in narrow spaces defined between the flattened portions 561 and the brake guide 556. After completing one operating cycle as stated above, by returning the lever 521 to its original position and again operating the lever 521 as stated above, the seat cushion 502 can be further raised or lowered.

Figure 8:
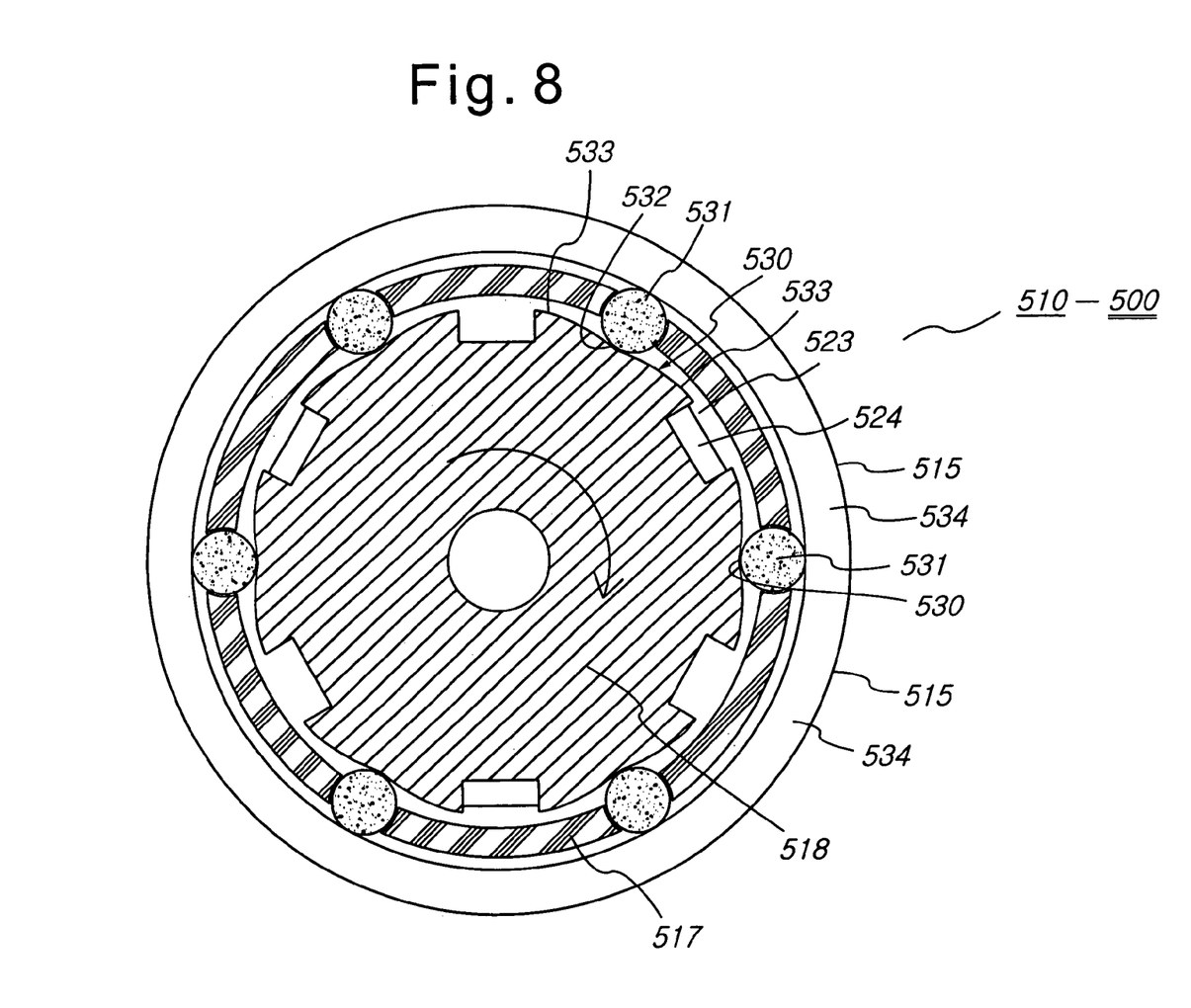
FIG. 8 is a sectional view illustrating a state wherein the clutch unit is returned to its original position after being actuated, in the seat cushion pumping device for a vehicle in accordance with the present invention.

The return of the lever 521 and the roller assembly 517 to their original positions is facilitated by the fact that, among constituent components of the clutch unit 510, the return spring 536 and the clutch spring 541, which are stretched while the lever bracket 519 is operated, return to their original positions.

That is, after completion of one operating cycle, by virtue of an elastic restoration force of the return spring 536 and the clutch spring 541 which are separated from each other in the direction where the lever 521 and the roller assembly 517 are operated, the lever 521 and the roller assembly 517 are returned to their original positions.

Figure 12:
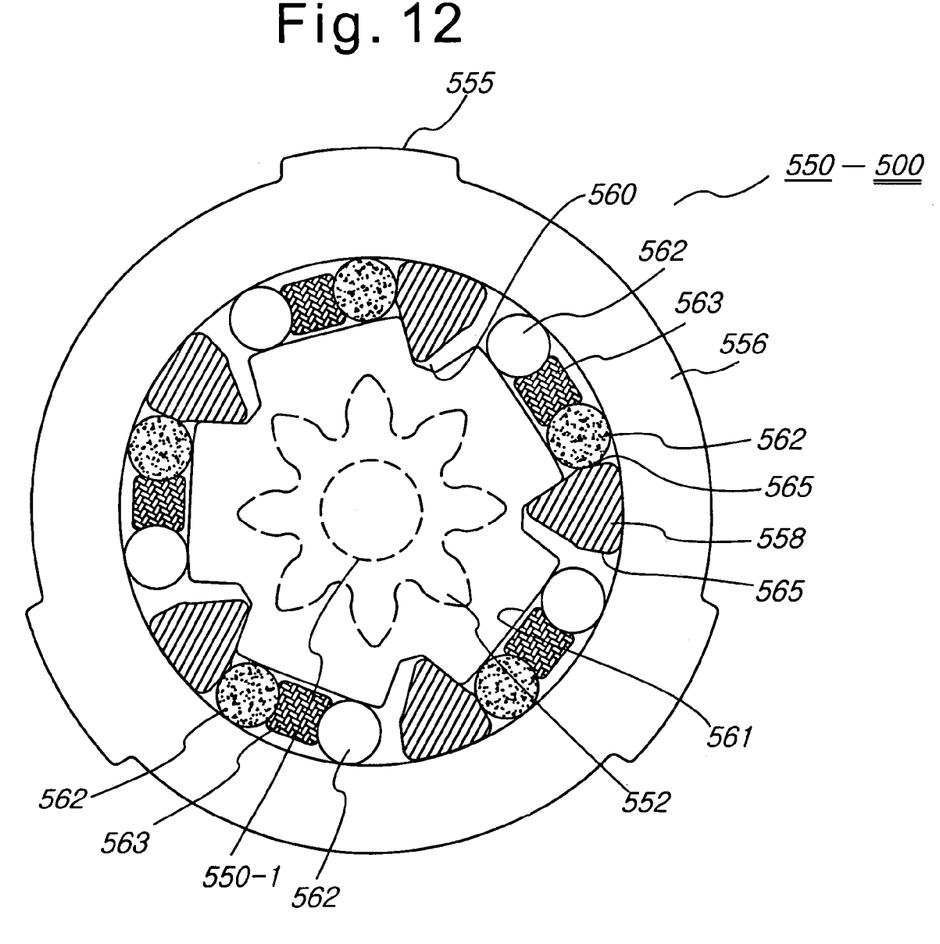
FIG. 12 is a sectional view illustrating a state of the brake unit after the clutch unit is maximally actuated, in the seat cushion pumping device for a vehicle in accordance with the present invention.

When the lever block 518, the roller assembly 517, and the lever 521 are returned to their original positions after the link connection gear 552 being operated as stated above, the base 515 is maintained in a rotated state. The reason for this is that, while the link connection gear 552 and the operating plate 557 of the brake unit 550 are rigidly secured around the shaft 550-1, the lever block 518 of the clutch unit 510 can be maintained only in its present position in a non-secured state.

In this regard, although the base 515 is not secured around the shaft 550-1, due to the fact that the power transmission pins 558 formed at the other surface of the base 515 are engaged with the power transmission grooves 560 of the operating plate 557, the base 515 can be still maintained in the rotated state.

Specifically, when the base 515 is rotated and then the lever 521 is returned to its original position, while a rotating force is applied to the operating plate 557, the brake pins 562, which are interposed between the flattened portions 561 of the operating plate 557 and the brake guide 556, are pushed in the circumferential direction of the flattened portions 561 by the elastic members 563, thereby causing the brake pins 562 to be fixedly maintained in the narrow spaces between the flattened portions 561 and the brake guide 556.

When the lever 521 is returned to its original position, there occur a loss corresponding to a gap, which is defined between the power transmission pins 558 and the power transmission grooves 560 of the operating plate 557. In order to reduce such a loss, therefore, the base 515 is frictionally compressed by the base plate pieces 572 of the push nut 570, which is maintained in position by the flanges 573 of the lower bracket 513.

By repeating the above-described operations, it is possible to freely adjust a height of the seat cushion 502 in a desired direction by selecting the upward direction (UP) or downward direction (DW) of the lever 521.

As can be seen from the above description, the lever block 518 is operated about the center point thereof, and the lever 521, which is for operating the lever block 518, is coupled to an outer circumferential position of the lever block 518 considerably distant from the center point of the lever block 518, resulting in a reduction in operating force of the lever 521 and consequently resulting in ease of operation by a driver or passenger.

Further, since a plurality of the rollers 531 provided on the roller assembly 517, which comes into close contact with the base 515 by the lever block 518, are arranged by appropriate equal distances, they can evenly affect throughout the drum 534 of the base 515, resulting in security in a more stable operating force.

Furthermore, the base 515 can be free from the influence of gaps generated between the power transmission pins 558 and the power transmission grooves 560 by virtue of the fact that it is additionally caught by the push nut 570, and the power transmission grooves 560 are equiangularly distributed in five directions so as to affect throughout the brake guide 556 inserted in the lower bracket 513, resulting in an enhancement in a resulting braking force and durability.

As apparent from the above description, the present invention provides a seat cushion pumping device for a vehicle, which enables an overall height of a seat cushion to be easily adjusted by using a single pumping device, ensures a more easy clutching operation even with a relatively low operating force, and enhances a braking force, resulting in an improvement in durability, quality, and operation capability of the pumping device itself and the convenience of use thereof.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A seat cushion adjusting device for a vehicle, for engaging with a link means adapted to adjust a height of a seat cushion upon a user's operation of an adjusting lever, comprising:
    a clutch unit adapted to transmit a rotating force to the link means in a desired direction where the seat cushion is to be moved; and
    a brake unit for fixing the operated link means so as not to move,
    wherein the clutch unit and the brake unit are accommodated between a lower bracket and an upper bracket,
    wherein the clutch unit is arranged between the upper bracket and one surface of a base, which is interposed between the lower bracket and the upper bracket, and the brake unit is arranged between the lower bracket and the other surface of the base,
    wherein the clutch unit includes:
    a roller assembly accommodated in a clutch recess defined on the one surface of the base, the roller assembly including an annular retainer ring with a plurality of rollers received in roller-receiving cavities formed at regular intervals in the annular retainer ring;
    a lever block rotatably received in the annular retainer ring of the roller assembly; and
    a lever bracket coupled to the lever block to operate it,
    wherein the brake unit includes:
    a link connection gear coupled with a shaft and extending through shaft holes of the lower bracket for engaging with the link means;
    an operating plate accommodated in a brake guide, which is coupled into a receiving recess of the lower bracket;
    power transmission grooves formed on an outer circumferential surface of the operating plate and adapted to receive power from power transmission pins formed on the other surface of the base;
    flattened portions each formed between the power transmission grooves on the outer circumferential surface of the operating plate;
    plural pairs of brake pins accommodated between the flattened portions and the brake guide, and adapted to transmit only in an operating direction power of the base and prevent transmission thereof in a reverse direction; and
    elastic members, each being interposed between two adjacent brake pins of the plural pairs of brake pins, and adapted to continuously push the brake pins in a circumferential direction of the flattened portions for fixedly maintaining the brake pins between an inner circumferential surface of the brake guide and the flattened portions, and
    wherein pin pushers integrally protrude from both sides of the respective power transmission pins, which are integrally formed on the other surface of the base, the pin pushers being positioned adjacent to the brake pins, and
    wherein the lever bracket has a spring hook protruding toward the base, the spring hook, along with a spring hook of the lower bracket, being caught by a return spring adapted to return the adjusting lever in an original position.

2. The device as set forth in claim 1, wherein the lever block further has a plurality of operating surfaces arranged at regular intervals along the outer circumferential surface thereof,
    wherein the operating surfaces are centrally formed with roller slits, respectively, for positioning the plurality of rollers of the roller assembly thereon, and
    wherein the operating surfaces are further formed at both sides of the respective roller slits with curvedly inclined operating surfaces, which are raised relative to the roller slits, and are adapted to cause the rollers to come into frictional contact with a drum of the base, thereby allowing the base to rotate by using an operating force of the adjusting lever.

3. The device as set forth in claim 2, wherein the roller assembly has a boss, around which a clutch spring is coupled, and wherein the clutch spring is caught at both ends thereof by one of spring pins, which protrudes downward from an upper side of an inner diameter surface of the upper bracket, thereby allowing the roller assembly to be returned in a neutral position.

4. The device as set forth in claim 1, wherein around an outer circumferential surface of the base is provided a push nut for preventing generation of a return loss of the lever due to gaps between the power transmission pins and the power transmission grooves of the operating plate, wherein the push nut includes:

a push nut body made as an elastic thin sheet member; and base plate pieces formed at an inner diameter surface of the push nut body and having an "L"-shape for ensuring tight contact thereof to the outer circumferential surface of the base, and wherein the push nut body is compressed at an outer diameter surface thereof by flanges protruding from the lower bracket.

* * * * *